(12) United States Patent
Godowski et al.

(10) Patent No.: US 10,248,411 B2
(45) Date of Patent: Apr. 2, 2019

(54) DYNAMIC DATA INGESTION

(71) Applicant: International Business Machines Corporation, Armonk, NY (US)

(72) Inventors: Piotr P. Godowski, Cracow (PL); Artur Obrzut, Cracow (PL); Luigi Pichetti, Rome (IT); Krzysztof Pienkowski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 15/058,737

(22) Filed: Mar. 2, 2016

(65) Prior Publication Data
US 2017/0255685 A1    Sep. 7, 2017

(51) Int. Cl.
*G06F 17/30* (2006.01)
*G06F 8/70* (2018.01)
*G06F 9/4401* (2018.01)
*G06F 9/455* (2018.01)

(52) U.S. Cl.
CPC ............. *G06F 8/70* (2013.01); *G06F 9/4411* (2013.01); *G06F 9/45558* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 6,968,373 B1 * | 11/2005 | Norris | G06F 21/10 709/223 |
| 8,150,961 B1 | 4/2012 | Bird et al. | |
| 2007/0050777 A1 * | 3/2007 | Hutchinson | G06F 11/0709 718/104 |
| 2010/0199350 A1 * | 8/2010 | Lilibridge | G06F 9/4843 726/24 |

OTHER PUBLICATIONS

Metawei, et al., "Load balancing in distributed multi-agent computing systems", Ain Shams Engineering Journal (2012) 3, 237-249. http://www.sciencedirect.com/science/article/pii/S2090447912000172 Copyright 2012 Ain Shams University.
Pecjak, et al., "Dynamic Load Balancing for SAS ETL Studio 9.1", SUGI 30 Systems Architecture, Paper 220-30. pp. 1-5. http://www2.sas.com/proceedings/sugi30/220-30.pdf.
Unknown, "IT Asset Tracking", https://www.manageengine.com/products/asset-explorer/track-it-assets.html Last printed Oct. 26, 2015. 4 pages.
Unknown, "Real-time scanning of software inventory", IP.com Prior Art Database Technical Disclosure. IP.com No. IPCOM000225137D, IP.com Electronic Publication Date: Jan. 25, 2013. 3 pages.
Unknown, "Intelligent method of software inventory scan optimization based on sensor scans", IP.com Prior Art Database Technical Disclosure. IP.com No. IPCOM000237868D, IP.com Electronic Publication Date: Jul. 17, 2014. 3 pages.

* cited by examiner

*Primary Examiner* — Anhtai V Tran
(74) *Attorney, Agent, or Firm* — Stosch Sabo

(57) ABSTRACT

A virtual scan group manager (VSGM) can receive a plurality of respective sets of data from a plurality of respective (Continued)

devices. The VSGM can allocate respective portions of the plurality of respective sets of data to respective virtual scan groups (VSGs). The VSGs can be processed by storing the data contained in each VSG in a data repository. Respective sets of data stored in the data repository can be catalogued in a VSGM logfile.

20 Claims, 4 Drawing Sheets

DYNAMIC DATA INGESTION

BACKGROUND

The present disclosure relates to data ingestion, and more specifically, to scanning and storing data from a plurality of devices.

Extract, transform, and load (ETL) processes can be used to retrieve a variety of data from a variety of devices (extract), convert the data into a form suitable for storage (transform), and store the data in a repository (load). ETL processes can be used for data management, software management, asset management, and other uses.

SUMMARY

Aspects of the present disclosure include a method comprising receiving, at a virtual scan group manager (VSGM) stored on a software asset management (SAM) server, a plurality of respective device scans from a plurality of respective devices. The method can further comprise determining, for each device scan, a size of the device scan and an interval between a previous device scan and a current device scan for the device. The method can further comprise selecting respective device scans having an interval between a previous device scan and a current device scan above a time threshold. The method can further comprise compiling selected device scans in a plurality of respective virtual scan groups (VSGs). The method can further comprise processing the plurality of VSGs containing selected device scans by loading respective device scans of each VSG into a data repository stored on the SAM server. The method can further comprise recording each processed device scan in a VSGM logfile stored in the VSGM.

Aspects of the present disclosure can further include a system comprising a software asset management (SAM) server containing a virtual scan group manager (VSGM) and a data repository, where the VSGM is communicatively coupled to a plurality of devices producing a plurality of respective device scans, and where the VSGM comprises a processor and a memory storing a VSGM logfile. The processor of the VSGM can be configured to initiate an extract, transform, load (ETL) cycle to retrieve the plurality of respective device scans from the plurality of respective devices. The processor can be further configured to quantify a respective size of each respective device scan and a respective interval between a previous device scan and a current device scan for each respective device. The processor can be further configured to allocate each respective device scan having a respective interval above an interval threshold to a virtual scan group (VSG) of a plurality of VSGs. The processor can be further configured to load each respective VSG containing respective device scans having respective intervals above the interval threshold to the data repository. The processor can be further configured to update the VSGM logfile with a respective instance for each respective device scan loaded to the data repository.

Aspects of the present disclosure can further include a computer program product having a computer readable storage medium with program instructions embodied therewith. The computer readable storage medium is not a transitory signal per se. The program instructions can be executable by a processor to cause the processor to extract respective sets of data from a plurality of devices and to determine, for each respective set of data, a respective size of the respective set of data and a respective interval between a last time the respective set of data was stored and a current time. The program instructions can further cause the processor to generate a plurality of virtual scan groups (VSGs) based on a quantity of respective sets of data, respective sizes of the respective sets of data, and respective intervals of the respective sets of data. The program instructions can further cause the processor to populate each respective VSG with a plurality of respective sets of data having a respective interval above an interval threshold and to process each respective VSG by storing the plurality of respective sets of data of each respective VSG in a database. The program instructions can further cause the processor to write, to a virtual scan group manager (VSGM) logfile, information regarding each respective set of data that is stored in the database.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
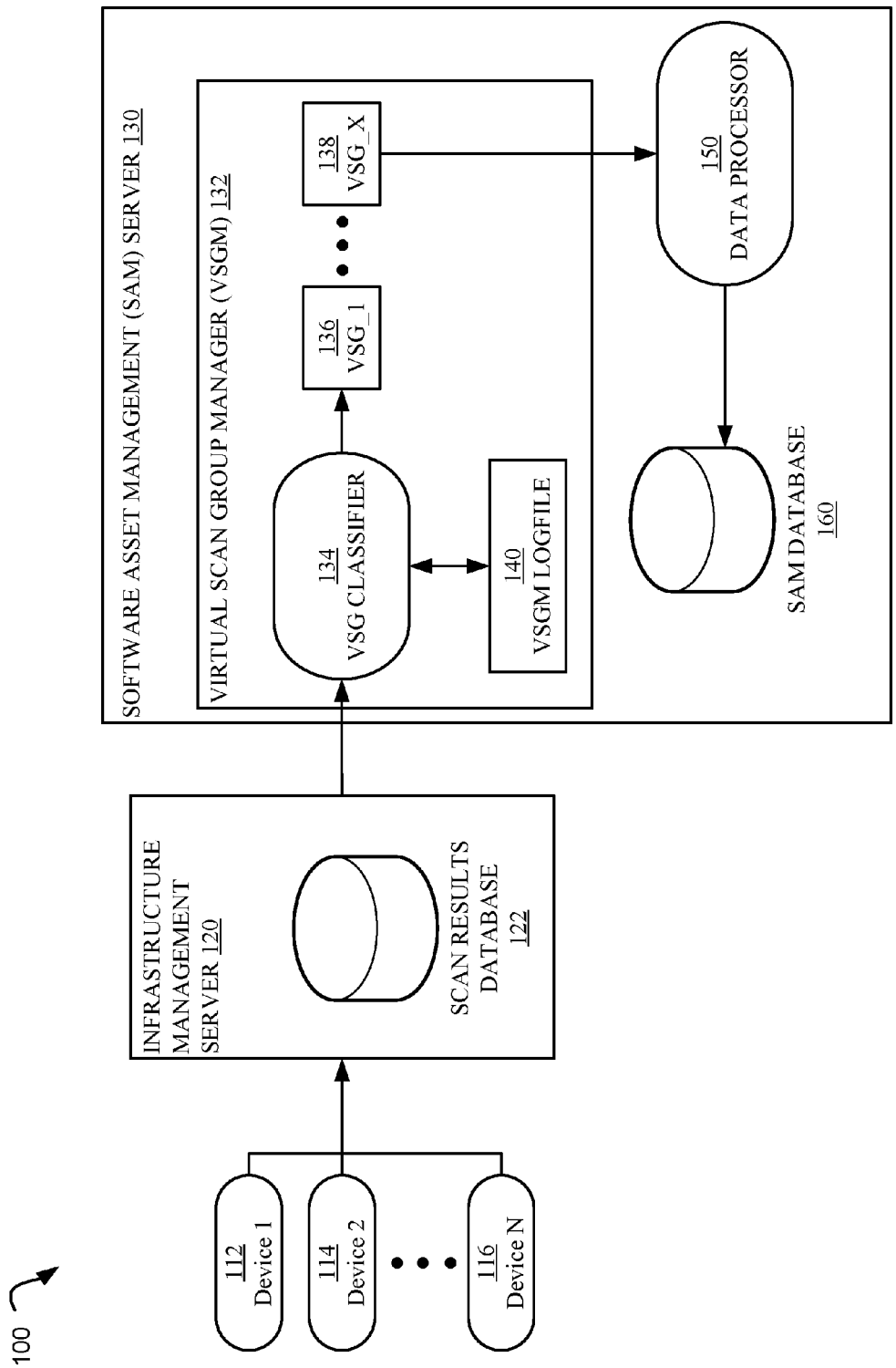
FIG. 1 illustrates a block diagram of an example data processing system in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to data ingestion. More particular aspects relate to processing and storing data from a plurality of devices during, for example, an extract, transform, load (ETL) cycle. Although not limited to such applications, an understanding of some embodiments of the present disclosure may be improved given the context of processing and storing data from a plurality of devices.

Embodiments of the present disclosure can receive numerous device scans from numerous devices (e.g., thousands or hundreds of thousands). The respective device scans can be evaluated for data freshness. Data freshness can refer to an interval between a current device scan and a previously uploaded device scan. The lower the interval, the fresher, or more recently, the data was previously uploaded. Device scans having a time interval above a threshold can be allocated to a virtual scan group (VSG). A plurality of VSGs of similar size can be created. Following evaluation and allocation of the device scans, the plurality of VSGs can be processed by storing the plurality of device scans contained in each VSG in a data repository.

Advantageously, embodiments of the present disclosure can result in improved average data freshness amongst the plurality of devices. Improved average data freshness can mean the average interval between a previously uploaded device scan and a current device scan decreases for the plurality of devices. Furthermore, embodiments of the present disclosure can advantageously result in a consistent and predictable processing time for each VSG. Further still, embodiments of the present disclosure can advantageously use a single server having a virtual scan group manager (VSGM) embodied therewith to execute aspects of the present disclosure. It is to be understood that the aforementioned advantages are example advantages, and embodiments of the present disclosure exist which can contain all, some, or none of the aforementioned advantages while remaining within the spirit and scope of the present disclosure.

Aspects of the present disclosure can be used for, among other purposes, asset discovery, software asset management, license usage reporting, and mitigation of security risks derived from inappropriate or undesired software on the managed devices. In some embodiments, respective device scans can contain data regarding the duration of use and/or the type of use for various assets, software, and/or applications. Thus, embodiments of the present disclosure can be useful for identifying, monitoring, maintaining, and/or auditing an organization's licensed and unlicensed software use.

Referring now to the figures, FIG. 1 illustrates a block diagram of an example scan data processing system in accordance with embodiments of the present disclosure. The scan data processing system 100 can contain one or more devices (e.g., devices 112, 114, and 116), an infrastructure management server 120, and a software asset management (SAM) server 130.

As shown, the scan data processing system can contain numerous devices such as device 1 112, device 2 114, and device N 116. Although three devices are shown, more or fewer devices are possible. In some embodiments, thousands or hundreds of thousands of devices are connected to the infrastructure management server 120 or directly to the SAM server 130. Furthermore, in some embodiments, the devices may be similar or dissimilar in nature. For example, the devices can be computers, desktops, laptops, servers, cell phones, or other devices capable of storing data, generating data, executing software, and/or executing applications.

The infrastructure management server 120 can compile (e.g., receive, stage, host, collect, and/or otherwise obtain) scan data retrieved from the devices 112-116. The infrastructure management server 120 can store device scan results in a scan results database 122. In some embodiments, respective device scans can include information such as, but not limited to, asset type, usage data, and/or version data for various devices, software programs, and/or applications operating on the respective devices.

At regular intervals, the SAM server 130 can trigger an ETL cycle to process the data collected from the scanned devices in the infrastructure management server 120. The ETL cycle can extract scan data into a virtual scan group manager (VSGM) 132 which can be located on the SAM server 130.

The VSGM 132 can contain a virtual scan group (VSG) classifier 134, multiple VSGs such as VSG_1 136 and VSG_X 138 (where the variable X indicates any number of possible VSGs), and a VSGM logfile 140. The VSG classifier 134 can receive respective device scans from the infrastructure management server 120 and evaluate the data.

The VSG classifier 134 can evaluate the scan results by viewing the scan results metadata and/or by viewing the VSGM logfile 140. The VSGM logfile 140 can contain a record of the device, the size, and the date of each processed device scan. The VSG classifier 134 can determine the freshness of the device scan data (i.e., the interval between the last date/time a respective device scan for a respective device was processed and the date/time of a current scan for the respective device), the size of the device scan, and the amount of modified information compared to a previously processed device scan for each respective device. The VSG classifier 134 can use this information to allocate respective device scans into one or more VSGs. In some embodiments, each VSG has a similar size to ensure processing of each VSG occurs in a substantially equal amount of time. The number of VSGs can be based, in whole or in part, on the size of the device scans and/or on the freshness of the data contained in the device scans.

Once the VSG classifier 134 has generated a respective VSG and recorded, for each respective device scan in the VSG, the device ID, the size of the scan, and the current date and time in the VSGM logfile 140, the respective VSG can be sent to data processor 150 and stored in SAM database 160. In some embodiments, the data processor 150 transforms the data contained in each respective VSG to a form suitable for loading into SAM database 160. For example, data processor 150 can transform the data by selecting less than the full set of data, by translating coded values, by encoding values, by joining data, by deduplicating data, and so on.

Thus, FIG. 1 illustrates a block diagram of an example scan data processing system in which a plurality of device scans from a plurality of devices can be evaluated and compiled into a plurality of VSGs that can be processed and stored in a database. In some embodiments, device scans having the oldest average data can be processed first, thereby improving average data freshness and reducing the variation in data freshness between the plurality of devices.

Figure 2:
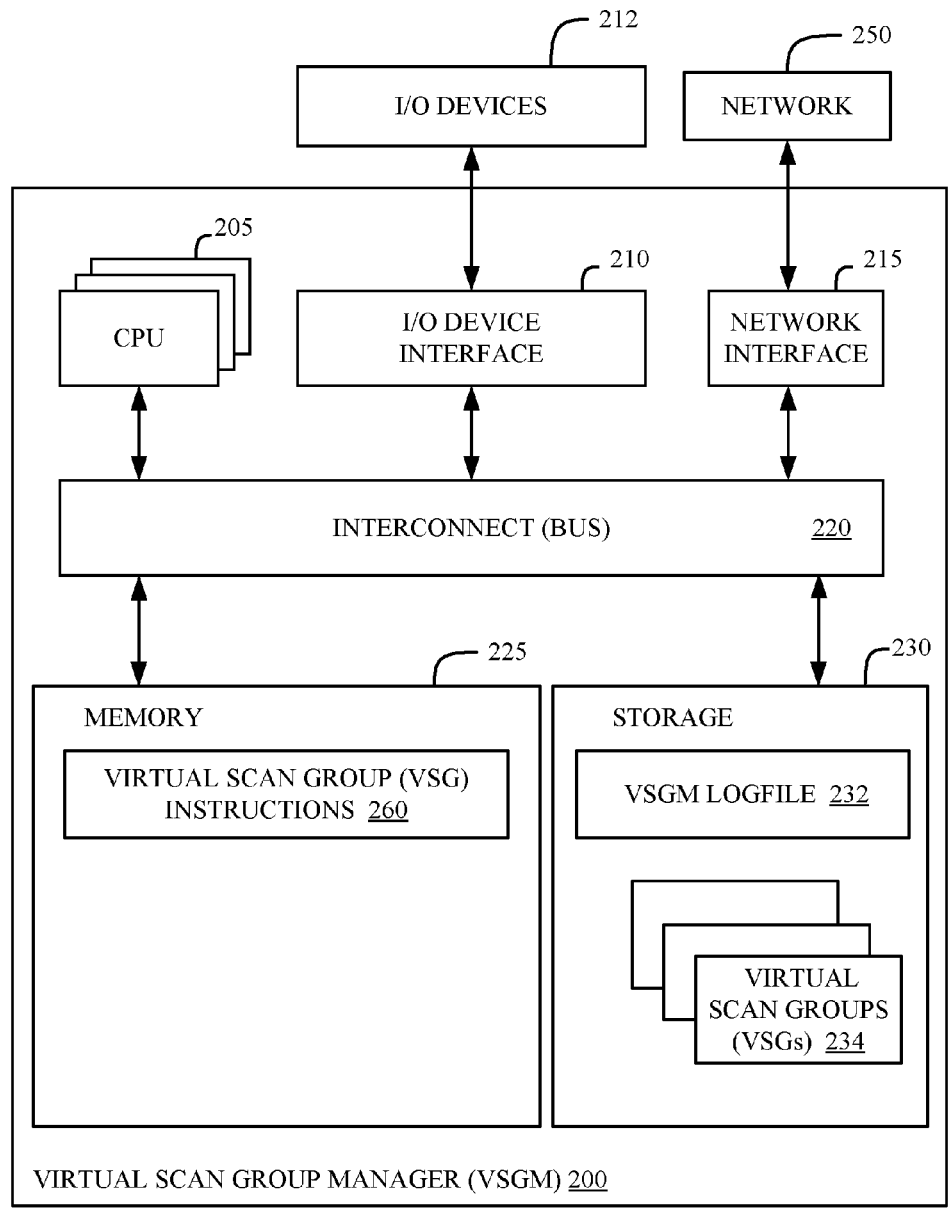
FIG. 2 illustrates a block diagram of a virtual scan group manager (VSGM) in accordance with embodiments of the present disclosure.

Referring now to FIG. 2, illustrated is a block diagram of a virtual scan group manager (VSGM) in accordance with some embodiments of the present disclosure. In some embodiments, the VSGM 200 is consistent with the VSGM 132 of FIG. 1. In various embodiments, the VSGM 200 includes a memory 225, storage 230, an interconnect (e.g., BUS) 220, one or more processors (e.g., CPUs) 205, an I/O device interface 210, I/O devices 212, and a network interface 215.

Each processor 205 can be communicatively coupled to the memory 225 or storage 230. Each processor 205 can retrieve and execute programming instructions stored in the memory 225 or storage 230. In some embodiments, each processor 205 can execute methods as shown and described hereinafter with reference to FIGS. 3-4. The interconnect 220 is used to move data, such as programming instructions, between the CPU 205, I/O device interface 210, storage 230, network interface 215, and memory 225. The interconnect 220 can be implemented using one or more busses. The processors 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the virtual scan group manager 200 via the I/O device interface 210 or a communication network 250 via the network interface 215.

The network 250 can be implemented by any number of any suitable communications media (e.g., wide area network (WAN), local area network (LAN), Internet, Intranet, etc.). In certain embodiments, the network 250 can be implemented within a cloud computing environment or using one or more cloud computing services. In some embodiments, the network interface 215 communicates with both physical and virtual networks.

The VSGM 200 and the I/O devices 212 can be local to each other and communicate via any appropriate local communication medium (e.g., local area network (LAN), hardwire, wireless link, Intranet, etc.), or they can be physically separated and communicate over a virtual network. In some embodiments, the I/O devices 212 can include a display unit capable of presenting information to a user (e.g., ETL cycle metrics) and receiving information from a user (e.g., ETL cycle initiation, a predetermined number of VSGs, etc.). In some embodiments, the I/O devices 212 can include a plurality of devices generating device scans that the VSGM 200 can receive via the I/O device interface 210. In some embodiments, the VSGM 200 can receive device scans via I/O device interface 210 and/or via network interface 215.

In some embodiments, the memory 225 stores virtual scan group (VSG) instructions 260 while the storage 230 stores a virtual scan group manager (VSGM) logfile 232 and a plurality of virtual scan groups (VSGs) 234. However, in various embodiments, the VSG instructions 260, VSGM logfile 232, and VSGs 234 are stored partially in memory 225 and partially in storage 230, or they are stored entirely in memory 225 or entirely in storage 230, or they are accessed over a network 250 via the network interface 215.

The VSG instructions 260 can store processor executable instructions to initiate and implement various methods such as the methods shown and described hereinafter with respect to FIGS. 3-4. In some embodiments, the VSGM logfile 232 can be queried during the execution of VSG instructions 260. The VSGM logfile 232 can contain a respective instance for each respective device scan uploaded to a data repository (e.g., SAM database 160 of FIG. 1). The VSGM logfile 232 can contain a device identifier, a device scan size, and a device scan date and time for each respective instance. VSGs 234 can be created and populated by device scans during execution of VSG instructions 260. In some embodiments, the device scans allocated to VSGs 234 can be recorded in VSGM logfile 232. The quantity of VSGs 234 can be configurable by a user or automatically generated based on, for example, the size of the plurality of device scans.

In some embodiments, the storage 230 can further store device scan content (not shown). For example, respective device scans from respective devices can be accumulated in storage 230 until VSG instructions 260 are executed, at which point the device scan content can be analyzed and loaded to a data repository in accordance with the methods shown and described hereinafter with respect to FIGS. 3-4.

Figure 3:
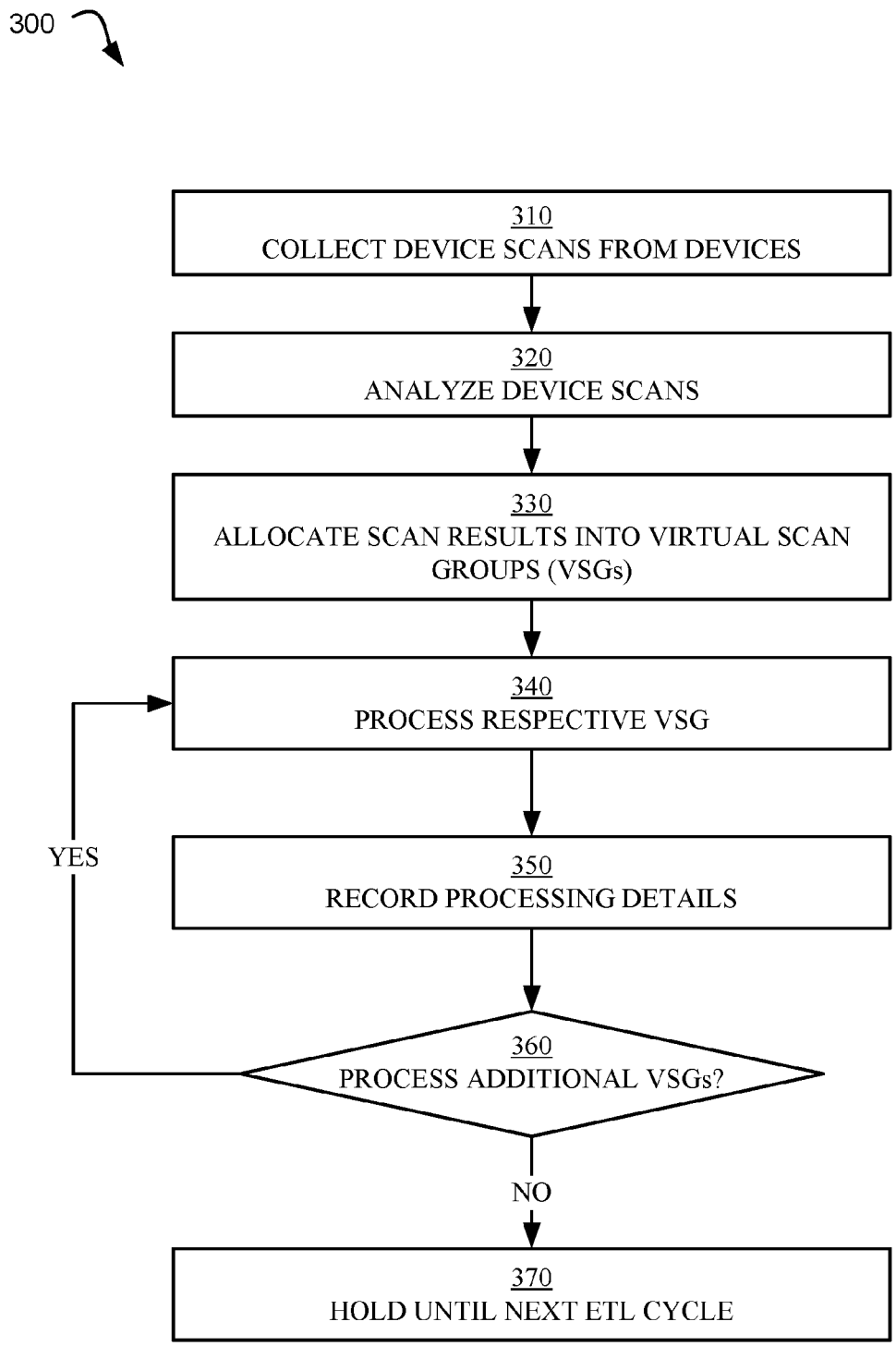
FIG. 3 illustrates a flowchart of an example method for processing a plurality of device scans in accordance with embodiments of the present disclosure.

Referring now to FIG. 3, illustrated is a flowchart of an example method for processing and storing a plurality of scan results from a plurality of devices. In some embodiments, the method 300 can be implemented by a processor (e.g., processor 205 of FIG. 2) executing a set of instructions (e.g., VSG instructions 260 of FIG. 2).

The method 300 can begin with operation 310 by collecting a plurality of device scans from a plurality of devices. In operation 320, each device scan can be analyzed to determine the size of the device scan, the freshness of the data (i.e., the time interval between the current device scan and the previously processed device scan for the respective device), and the proportion of changed data relative to a previously processed device scan of the same device. In operation 330, a plurality of device scans can be allocated to a set of VSGs. Each VSG can be approximately the same size, where approximately the same size can mean each VSG of a set of VSGs can process the data stored therein in approximately the same amount of time. For example, in some embodiments, each VSG can be approximately the same size such that each VSG processes its data within a plus or minus tolerance of, or a total tolerance of, a specified percentage (e.g. 5%, 10%, 25% or 50%) of the time a different VSG in the same set of VSGs processes its data. Alternatively, rather than time, the aforementioned tolerances can be based on the amount of data stored in each respective VSG. For example, a respective VSG of a set of VSGs can contain an amount of data within a plus or minus tolerance of, or a total tolerance of, a specified percentage (e.g. 5%, 10%, 25%, 50%, etc.) of the amount of data stored in a different VSG of the set of VSGs. In some embodiments, the percentage tolerance can be based on a VSG of two or more VSGs having a longest processing time or a largest amount of data. That is, in such embodiments, the difference in processing time between two respective VSGs is less than the predetermined percentage (e.g. 5%, 10%, 25%, 50%, etc.) of the longest processing time of the two respective VSGs.

In some embodiments, a first portion of the plurality of device scans can be allocated to a first set of VSGs and a second portion of the plurality of device scans can be allocated to a second set of VSGs. The first portion can be distinguished from the second portion based on one or more attributes of the respective device scans such as, for example, the time interval between the current device scan and the previous device scan for a respective device (i.e., the freshness of the device scan).

In operation 340, a respective VSG can be selected and processed. Operation 340 can included transforming, if necessary, the data to a format suitable for storage, and loading the data into a data repository (e.g., SAM database 160 of FIG. 1). In various embodiments, the respective VSG can be selected non-preferentially or preferentially based on a set of attributes. In some embodiments where the respective VSG is selected non-preferentially, the selection can be sequential according to VSG number, a round-robin scheduling method, or a different method to non-preferentially process the VSGs. In some embodiments where the respective VSG is selected preferentially, the selection can be based on attributes such as, for example, the freshness of the data in the VSG, the proportion of changes in the device scans of the VSG relative to the last stored device scans for the respective devices, and/or other attributes.

Operation 350 can record processing details. In some embodiments, operation 350 records details in a VSGM logfile (e.g., VSGM logfile 232 of FIG. 2). Operation 350 can write, for example, a device ID, a device scan size, and a date and time for each respective device scan in each processed VSG to the VSGM logfile.

Operation 360 can determine if additional VSGs can be processed prior to expiration of the ETL process. If there is more time and/or space available, the method 300 can return to operation 340 and select another VSG for processing. If there is no more time and/or space available in the current ETL, the method 300 can proceed to operation 370 and hold pending VSGs and/or device scans until a new ETL cycle is initiated.

Thus, FIG. 3 illustrates an example method for processing a plurality of device scans in a given ETL. The various device scans can be collected and compiled in one or more VSGs. The VSGs can be non-preferentially or preferentially selected for processing and storage. Aspects of the method can repeat until the ETL cycle has expired or there are no remaining VSGs.

Figure 4:
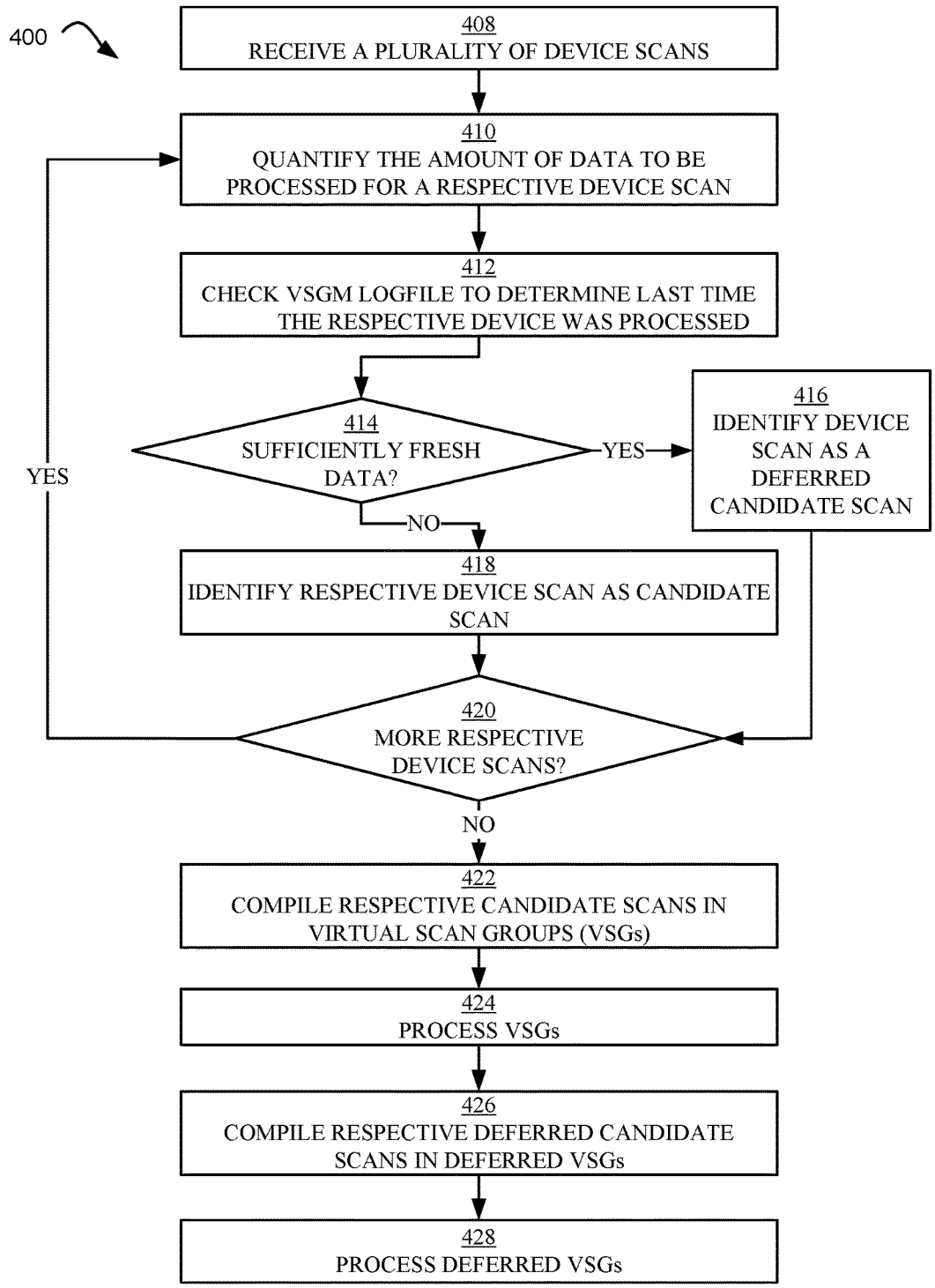
FIG. 4 illustrates a flowchart of an example method for creating and processing virtual scan groups (VSGs) in accordance with embodiments of the present disclosure.

Referring now to FIG. 4, illustrated is a flowchart of another example method for classifying and processing respective device scans in accordance with embodiments of the present disclosure. In some embodiments, the method 400 can be implemented by one or more processors (e.g., processors 205 of FIG. 2) executing a set of instructions (e.g., VSG instructions 260 of FIG. 2).

The method 400 can begin by receiving a plurality of device scans in operation 408. A respective device scan can be selected and the amount of data in the device scan can be quantified in operation 410. In some embodiments, the respective device scan can contain a full set of data representing the data on the device, or the device scan can contain data representing changes to the data on the device relative to a previous device scan of the respective device. For example, a respective device scan can contain a usage history of a selective software since installation on a respective device, or a respective device scan can contain a usage history of a selective software since a previous device scan of the respective device.

In operation 412, the method 400 can query a VSGM logfile (e.g., VSGM logfile 232 of FIG. 2) to determine the last time a scan of the respective device was processed. In some embodiments, the VSGM logfile can contain a respective instance for each processed device scan. Each respective instance can comprise a respective device identification, a respective scan size, and a respective processing date and time.

Operation 414 can determine if the respective device scan data is sufficiently recent. Operation 414 can determine the freshness of the data by comparing the time and/or date of the respective device scan with the time and/or date of the previous device scan for the respective device as recorded in the VSGM logfile. In the event the data is sufficiently recent (e.g., the time between the current scan and the previously processed scan is below a time threshold), then the method 400 can proceed to operation 416 and identify the respective device scan as a deferred candidate scan and subsequently proceed to operation 420 (described in further detail hereinafter). In some embodiments, a deferred candidate scan can comprise a respective device scan for a respective device that has uploaded a previous device scan in a time below a time threshold (i.e., the device scan for the respective device was uploaded sufficiently recently). In the event that operation 414 determines the device scan is not sufficiently recent, the method 400 can proceed to operation 418.

Operation 418 can identify the respective device scan as a candidate device scan. In some embodiments, a candidate device scan can indicate the respective device scan is a candidate for immediate processing based on the freshness of the data in the respective device scan compared to the data previously processed for the respective device.

Operation 420 can determine if there are more respective device scans to be evaluated. Should operation 420 determine there are more device scans to be evaluated, then the method 400 can return to operation 410 and identify a different respective device scan and quantify the amount of data to be processed in the respective device scan. Should operation 420 determine there are no more respective device scans to evaluate, then the method 400 can continue to operation 422.

Operation 422 can compile one or more respective candidate scans into one or more VSGs. The number and size of the VSGs can be configurable by a user or based on device scan data collected in operation 410. In some embodiments, the sizes of the VSGs are approximately equal such that the processing time of each respective VSG can be approximately equal to the processing time of each other VSG for a respective set of VSGs. In some embodiments, the respective candidate device scans can be non-preferentially compiled into one or more VSGs using a round-robin scheduling process. For example, for N VSGs, each candidate device can be allocated to a VSG based on calculating the following function: device_number modulo N, where the devices can be numbered sequentially and devices having similar values output by the function can be put in a same VSG.

In operation 424, the one or more VSGs can be processed. In some embodiments, the one or more VSGs can be processed in a non-preferential order or in a predefined order based on one or more rules. For example, a predefined order could be that respective VSGs are processed as soon as a respective VSG reaches a predefined size or percentage fullness. In a different example, respective VSGs can be processed in order of percentage of changes such that VSGs containing device scans that contain a greater number of differences relative to the previous respective device scans can be processed first. For example, a first VSG can contain data that is more than 10% different from previously processed data while a second VSG can contain data that is less than 5% different from previously processed data. In such a case, the first VSG can be preferentially processed before the second VSG based on the difference in the proportion of changed data between the first VSG and the second VSG.

In operation 426, deferred device scans can be compiled in one or more deferred VSGs. The deferred device scans can be allocated to one or more deferred VSGs in a manner consistent with the manner that candidate device scans are allocated to VSGs. That is to say, deferred device scans can be allocated to respective deferred VSGs using, for example, a round-robin scheduling procedure implemented by a function such as, but not limited to, device_number modulo M, where M is the number of deferred VSGs created to process the deferred device scans.

In operation 428, deferred candidate scans can be processed. The deferred candidate scans can be processed until there are no more deferred candidate scans to process or until the respective ETL cycle runs out of space or time.

Thus, FIG. 4 illustrates an example method for processing a plurality of respective device scans such that a high average data freshness is maintained for the plurality of devices (e.g., chatty systems are not allowed to monopolize ETL processing resources), and the device scans complete in a predictable amount of time (e.g., each VSG is similarly sized and can therefore be processed in a similar amount of time).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A method comprising:
   receiving, at a virtual scan group manager (VSGM) stored on a software asset management (SAM) server, a plurality of respective device scans from a plurality of respective devices;
   determining, for each respective device scan, a respective size of the respective device scan and a respective interval between a previous device scan and a current device scan for the respective device;
   selecting respective device scans having a respective interval between a previous device scan and a current device scan above a time threshold;
   compiling selected device scans in a plurality of respective virtual scan groups (VSGs);
   processing the plurality of VSGs containing selected device scans by loading respective device scans of each respective VSG into a data repository stored on the SAM server; and
   recording each processed device scan in a VSGM logfile stored in the VSGM.

2. The method of claim 1, wherein each respective VSG is a similar size such that a difference in processing time between two respective VSGs of the plurality of VSGs is less than a predetermined percentage of a longest processing time of the two respective VSGs, and wherein the selected device scans are compiled in the plurality of VSGs based on respective sizes of the selected respective device scans.

3. The method of claim 1, wherein recording each processed device scan in a VSGM logfile comprises recording a respective device identification, a respective scan size, and a respective date and time of each processed device scan.

4. The method of claim 1, wherein compiling the selected device scans in the plurality of respective VSGs comprises a round-robin scheduling procedure.

5. The method of claim 4, wherein the round-robin scheduling procedure further comprises:
   calculating, for each respective device scan, a respective value representing a respective device number modulo the plurality of VSGs; and
   compiling each respective device scan having a same respective value in a same VSG.

6. The method of claim 1, wherein determining a respective size and a respective interval for each respective device scan further comprises determining a respective proportion of changed content of a current device scan relative to a previous device scan for each respective device; and
   wherein the plurality of VSGs are processed in sequential order based on a proportion of changed content of respective device scans in each respective VSG such that respective VSGs having a higher proportion of changed content are processed before respective VSGs having a lower proportion of changed content.

7. The method of claim 1, further comprising:
   deferring respective device scans having a respective time interval between a previous device scan and a current device scan below the time threshold;
   compiling one or more deferred device scans in one or more VSGs; and
   processing the one or more VSGs containing deferred device scans after processing the plurality of VSGs containing selected device scans.

8. A system comprising:
   a software asset management (SAM) server containing a virtual scan group manager (VSGM) and a data repository, wherein the VSGM is communicatively coupled to a plurality of devices producing a plurality of respective device scans, wherein the VSGM comprises a processor and a memory storing a VSGM logfile, the processor configured to:
      initiate an extract, transform, load (ETL) cycle to retrieve the plurality of respective device scans from the plurality of respective devices;
      quantify a respective size of each respective device scan and a respective interval between a previous device scan and a current device scan for each respective device;
      allocate each respective device scan having a respective interval above an interval threshold to a virtual scan group (VSG) of a plurality of VSGs;
      load each respective VSG containing respective device scans having respective intervals above the interval threshold to the data repository; and
      update the VSGM logfile with a respective instance for each respective device scan loaded to the data repository.

9. The system of claim 8, wherein each respective instance of the VSGM logfile comprises a respective date and time, a respective device scan size, and a respective device identification.

10. The system of claim 8, wherein each respective VSG is a same size, and wherein the plurality of VSGs is based on the respective sizes of the respective device scans.

11. The system of claim 8, wherein the processor configured to allocate each respective device scan having a respective interval above an interval threshold to a respective VSG is further configured to allocate each respective device scan according to a round-robin scheduling procedure.

12. The system of claim 11, wherein the round-robin scheduling procedure further comprises:
   calculating, for each respective device scan, a respective value representing a respective device number modulo the plurality of VSGs; and
   compiling each device scan having a same respective value in a same VSG.

13. The system of claim 8, wherein to quantify a respective size and a respective interval for each respective device scan, the processor is further configured to quantify a respective proportion of changed content of a current device scan relative to a previous device scan for each respective device; and
   wherein the processor configured to load each respective VSG containing respective device scans having respective intervals above the interval threshold is further configured to load respective VSGs in a sequential order based on a proportion of changed content of a plurality of device scans in each respective VSG such that respective VSGs having a higher proportion of changed content are processed before respective VSGs having a lower proportion of changed content.

14. The system of claim 8, wherein the processor is further configured to:
- defer respective device scans having a respective time interval between a previous device scan and a current device scan below the interval threshold;
- allocate one or more deferred device scans in one or more VSGs; and
- load each respective VSG containing device scans having an interval below the interval threshold after loading each respective VSG containing device scans having an interval above the interval threshold.

15. A computer program product comprising a computer readable storage medium having program instructions embodied therewith, wherein the computer readable storage medium is not a transitory signal per se, the program instructions executable by a processor to cause the processor to:
- extract respective sets of data from a plurality of devices;
- determine, for each respective set of data, a respective size of the respective set of data and a respective interval between a last time the respective set of data was stored and a current time;
- generate a plurality of virtual scan groups (VSGs) based on a quantity of respective sets of data, respective sizes of the respective sets of data, and respective intervals of the respective sets of data;
- populate each respective VSG with a plurality of respective sets of data having a respective interval above an interval threshold;
- process each respective VSG by storing the plurality of respective sets of data of each respective VSG in a database; and
- write, to a virtual scan group manager (VSGM) logfile, information regarding each respective set of data that is stored in the database.

16. The computer program product of claim 15, wherein to determine a respective interval the program instructions are further configured to further cause the processor to query a VSGM logfile, wherein the VSGM logfile contains, for each respective instance, a respective device identification, a respective size of a respective set of data, and a respective date when the respective set of data was stored in the database.

17. The computer program product of claim 15, wherein the program instructions configured to cause the processor to populate each respective VSG are further configured to further cause the processor to:
- calculate, for each respective set of data having an interval above the interval threshold, a respective value representing a respective device number modulo the plurality of VSGs; and
- compile each respective set of data having a same respective value in a same VSG.

18. The computer program product of claim 15, wherein the program instructions configured to cause the processor to determine a respective size and a respective interval for each respective set of data are further configured to further cause the processor to determine a respective proportion of changed content of a current set of data relative to a previous set of data for each respective set of data; and
- wherein the program instructions configured to cause the processor to process each respective VSG are further configured to further cause the processor to process each respective VSG in a sequential order based on a proportion of changed content of respective sets of data in each respective VSG such that respective VSGs having a higher proportion of changed content are processed before respective VSGs having a lower proportion of changed content.

19. The computer program product of claim 15, wherein the program instructions are further configured to further cause the processor to:
- defer respective sets of data having a respective interval below the interval threshold;
- populate one or more deferred VSGs with one or more deferred sets of data; and
- process, in response to processing the one or more VSGs containing respective sets of data having an interval above the interval threshold, the one or more deferred VSGs.

20. The computer program product of claim 15, wherein each respective VSG is a same size such that a respective VSG of a set of VSGs processes its data within 25% of a longest time a respective VSG of the set of VSGs processes its data.

\* \* \* \* \*